Patented June 21, 1927.

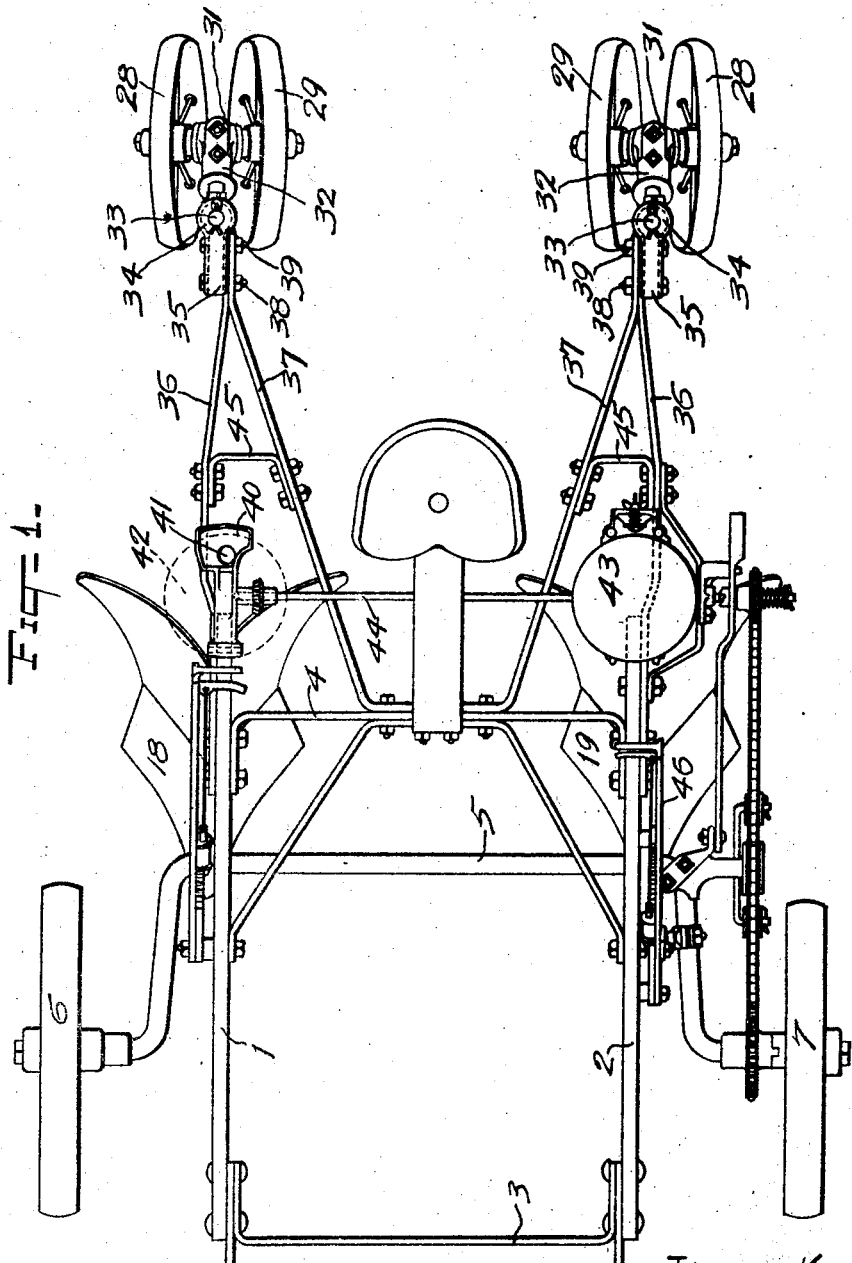

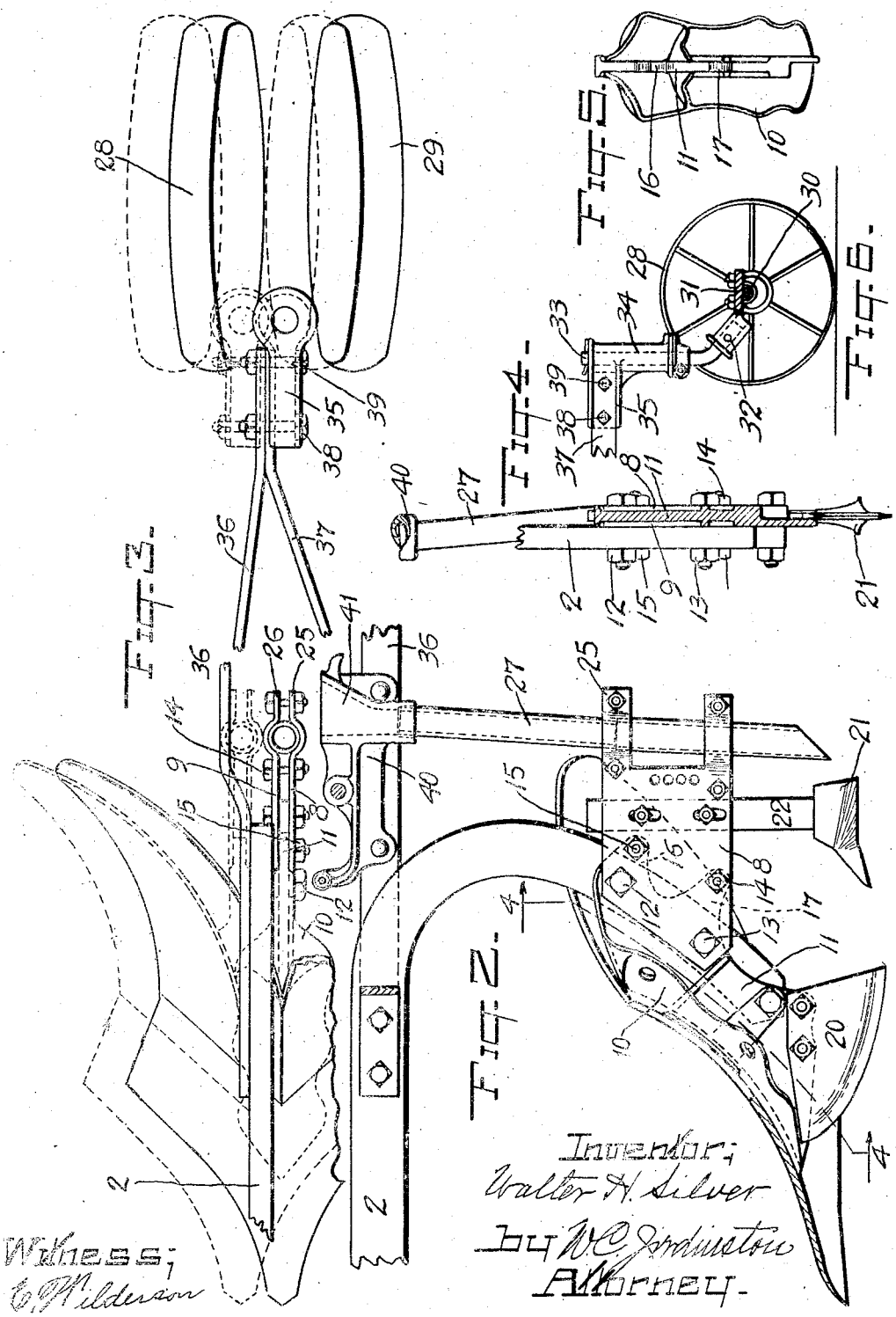

1,633,388

UNITED STATES PATENT OFFICE.

WALTER H. SILVER, OF MOLINE, ILLINOIS, ASSIGNOR TO DEERE & COMPANY, OF MOLINE, ILLINOIS, A CORPORATION OF ILLINOIS.

LISTER AND PLANTER.

Application filed August 23, 1922. Serial No. 583,789.

My invention relates to combined listers and planters of the two row type, and has for its object, more particularly, certain features of adjustment which will be clearly set forth in the following specification.

Referring to the drawings in which similar numerals indicate identical parts—

Figure 1 is a plan view of a lister and planter embodying my invention. Figure 2 is a fragmentary view in part section illustrating the mounting of the plow body and parts of the planter on the plow beam. Figure 3 is a plan view, in part of Figure 2, showing in dotted lines adjustment of the plow body and connected parts on the plow beam, and also showing adjustment of the rear supporting and covering wheels for alinement thereof with the planting mechanism. Figure 4 is a detail section on the line 4—4 of Figure 2. Figure 5 is a rear view of the frog, and Figure 6 is a detail of the rear wheel support.

The frame includes the plow beams 1 and 2 which are rigidly connected by a brace 3 at the forward ends of the beams, and by a similar brace 4 located intermediate the length of the beams. The beams are bent downwardly at their rear ends to form standards on which the plow bodies are supported. An axle 5 is rockably journaled in suitable bearings on the frame and is provided with crank ends on which are mounted supporting wheels 6 and 7. The rear portion of each plow beam comprises a downwardly extending standard fixedly connected to and preferably integral with the beam, which standards, as best shown in Fig. 4, have flat side faces at their opposite sides to provide surfaces for the attachment thereto of a bracket composed of plates 8, 9 spaced apart to receive between them the vertical web 11 of a frog 10. As best shown in Fig. 5, said web extends rearwardly from the central portion of the frog and as shown in Figs. 3 and 4 it fits between the forward end portions of the side plates 8, 9 to which it is secured by bolts 12, 13 which pass through said plates, the web and the standard so that by means of nuts screwed on said bolts the parts are rigidly held together, the rigidity being insured by bolts 14 and 15 which extend through the plates 8 and 9 and projections 16 and 17 on the web 11 of the frogs 10 as shown in dotted lines in Figure 2. The plates 8, 9, therefore, form an extension of the web 11 by which certain other parts are supported, as will be hereinafter explained. It will be noted that by the construction described the frog may be secured at either side of the standard, since the side faces of the standard provide attaching surfaces against which the outer faces of the plates 8, 9 may alternatively be fitted, and by shifting the web 11 and the bracket comprising the plates 8, 9 from one side to the other of the standard the frog will be shifted laterally with respect to the plow beam.

Secured on the frogs 10 respectively are lister plow bodies 18 and 19, and on the lower end of each frog is mounted a blade 20 in alinement with the plow points. A subsoiler 21, rearward of each cutter, is supported between the plates 8 and 9, the shank 22 of the subsoiler being held in position between the plates by suitable bolts which pass through slots 23 and 24 in the plates 8 and 9 whereby the subsoiler can be adjusted vertically. The plates 8 and 9 are provided with upper parallel and rearwardly extending arms 25 and 26 which are bent intermediate their length to receive a flexible spout 27, and similar arms extend from the lower part of the plates 8 and 9 and serve also to support the spout 27. By the construction described either or both plow bodies may be shifted laterally to vary the distance between rows by simply changing the position of the web 11 of the frog or frogs from one side to the other of the standard or standards to which they are attached, and this change may be made without disturbing any of the parts mounted on the frame or the connections of the spouts 27, since as said spouts are flexible their lower end portions are carried laterally with the plates 8, 9 when the latter are changed from one side to the other of the standards. The subsoiler 21 is also shifted with said plates.

The rear supporting and covering wheels 28 and 29 are journaled on axles 30 rigidly mounted on the rearward part of castings 31 which have forwardly inclined sleeves 32. Rigidly secured in the sleeves 32 are crank ends of spindles 33 having vertical portions rotatably journaled in bearings 34 integral with brackets 35. Extending rearwardly of the beams 1 and 2 respectively are supplemental frames composed of bars 36 and 37, the former rigidly secured to the beams 1 and 2, and the latter bolted to the central portion of the brace 4. The bars 36 and 37 converge rearwardly and at their rearward ends are provided with vertically disposed side faces at opposite sides thereof, the brackets 35 being provided with corresponding vertical side faces adapted to fit against the side faces of the bars 36, 37 and to be fastened thereto by bolts 38 and 39. As best shown in Figures 1 and 3, the vertically disposed side faces at the rear ends of the bars 36, 37 are substantially alined respectively with the corresponding side faces of the beam standards, and, therefore, by securing the bracket 35 and the web 11 of the corresponding unit at the same side of the supplemental frame and standard respectively the wheels 28, 29 of such unit may be maintained in proper relation to the furrow opener with which they are associated, notwithstanding adjustment of such furrow opener to change the distance between rows. All that it is necessary to do to make such change is to shift the plates 8, 9 from one side to the other of the standard to which they are connected, and to similarly shift the bracket 35 with respect to the supplemental frame to which it is attached. Mounted on the bars 36 are castings 40 having vertical openings 41 in the lower ends of which the spouts 27 are held. Seed hoppers 42 and 43 are supported on the castings 40 and the mechanism therein, for delivering seed to the openings 41 and the spouts 27, is operated by a shaft 44 journaled in bearings on the brackets 40 and operated by suitable gearing connected with the wheel 7. Braces 45 are bolted between the bars 36 and 37 to add rigidity to the structure. The lister is raised by rocking the axle 5 by operation of a lever 46 or by traction power of one of the front supporting wheels in a manner known in the art.

In the operation of a machine of this type it is often desirable to vary the distance between rows, consequently the listers, with their attached parts, and the rear supporting and covering wheels must be made adjustable laterally to provide for such variation. To vary the distance between the listers I remove the bolts 12 and 13 and shift the units comprising the plow bodies 18 and 19, the frog 10, the cutter 20, the brackets composed of the plates 8 and 9, and the subsoiler, to the opposite side of the standards, and re-insert the bolts 12 and 13 to hold the parts in the new position as shown in dotted lines in Figure 3, and as the spout 27 is flexible it readily adjusts itself to any change. The rear supporting and covering wheels are also adjusted laterally by removing the bolts 38 and 39 and shifting the castings 35 to that side of the bars to which the lister has been changed. These adjustments are provided without changing the position of the seed hoppers which are mounted on the frame in a permanent fixed position.

What I claim is—

1. In an agricultural implement, the combination with a wheel supported frame comprising plow beams fixedly secured at opposite sides thereof, and having fixed downwardly extending standards provided with faces at the sides thereof, of furrow openers adapted to be secured to said standards, each of said furrow openers having a frog secured thereto, said frog having a central vertical web extending rearwardly therefrom and adapted to overlie, alternatively, either side face of one of said standards, and means extending transversely of said web and standard for securing the web to its standard at either side thereof.

2. In a two row lister, the combination with a wheel supported frame comprising plow beams fixedly secured at opposite sides thereof, and having fixed downwardly extending standards provided with side faces, of furrow openers adapted to be secured to said standards, each of said furrow openers having a frog secured thereto comprising a rearwardly extending web, a bracket secured to said web and having faces at opposite sides thereof adapted to bear alternatively against one side face or the other of one of said standards, a seed tube connected with said bracket, and means for securing said bracket to said standard at either side thereof.

3. In a two row lister, the combination with a wheel supported frame comprising plow beams fixedly secured at opposite sides thereof and having fixed downwardly extending standards provided with side faces, rearwardly projecting supplemental frames fixedly connected with the side portions of said frame and having vertically disposed side faces at their rear ends substantially alined respectively with the corresponding side faces of said standards, furrow openers adapted to be secured to said standards, each of said furrow openers having a frog secured thereto, said frog having a central vertical web extending rearwardly therefrom and adapted to overlie, alternatively, either side face of one of said standards, means for securing the web to its standard at either side thereof, bearing brackets each having two vertically disposed side faces adapted, alternatively, to fit against the opposite side faces of one of said supplemental frames, whereby said bearing brackets may be maintained in substantial longitudinal alinement with said webs, means for securing said bearing brackets in position, spindles journaled in said bearing brackets, and covering wheels carried by said spindles.

WALTER H. SILVER.